United States Patent
Jaradi et al.

(10) Patent No.: US 10,377,340 B2
(45) Date of Patent: Aug. 13, 2019

(54) RESTRAINT SYSTEM

(71) Applicant: Ford Global Technologies, LLC, Dearborn, MI (US)

(72) Inventors: Dean M. Jaradi, Macomb, MI (US); S. M. Iskander Farooq, Novi, MI (US); Mohammed Omar Faruque, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 219 days.

(21) Appl. No.: 15/460,640

(22) Filed: Mar. 16, 2017

(65) Prior Publication Data
US 2018/0265033 A1 Sep. 20, 2018

(51) Int. Cl.
| B60R 22/36 | (2006.01) |
| B60R 22/343 | (2006.01) |
| B60R 21/0136 | (2006.01) |
| B60R 22/415 | (2006.01) |
| B60R 21/01 | (2006.01) |

(52) U.S. Cl.
CPC ........ *B60R 22/343* (2013.01); *B60R 21/0136* (2013.01); *B60R 22/36* (2013.01); *B60R 22/415* (2013.01); *B60R 2021/01013* (2013.01); *B60R 2021/01265* (2013.01)

(58) Field of Classification Search
CPC .... B60R 22/36; B60R 22/343; B60R 21/0136
See application file for complete search history.

(56) References Cited

U.S. PATENT DOCUMENTS

| 4,509,707 A | * | 4/1985 | Ernst | B60R 22/36 |
| | | | | 242/376.1 |
| 5,119,999 A | | 6/1992 | Krambeck | |
| 6,371,563 B1 | | 4/2002 | Washizuka | |
| 6,416,008 B1 | | 7/2002 | Fujii et al. | |
| 7,025,297 B2 | | 4/2006 | Bell et al. | |
| 8,165,760 B2 | | 4/2012 | Cuddihy et al. | |
| 9,126,565 B2 | | 9/2015 | Lee et al. | |
| 2006/0006725 A1 | * | 1/2006 | Gentner | B60R 22/46 |
| | | | | 297/479 |

FOREIGN PATENT DOCUMENTS

| DE | 10248262 B3 | 3/2004 |
| EP | 2052920 B1 | 7/2011 |
| GB | 2551869 A | 1/2018 |
| KR | 101476615 B1 | 12/2014 |

OTHER PUBLICATIONS

GB Search Report dated Aug. 28, 2018 re GB Appl. No. 1803937.0.

* cited by examiner

*Primary Examiner* — Sang K Kim
(74) *Attorney, Agent, or Firm* — Frank A. MacKenzie; Bejin Bieneman PLC

(57) ABSTRACT

A restraint system includes a housing, a spool rotatably coupled to the housing, and an actuator fixed relative to the housing. The spool has a base plate with holes. The holes are spaced from each other circumferentially about the spool. The actuator has a pin movable between an engaged position extending into one of the holes and a disengaged position spaced from the holes.

15 Claims, 9 Drawing Sheets

RESTRAINT SYSTEM

BACKGROUND

Vehicles include seatbelts for each of the seats onboard. The seatbelt includes webbing that, when the seatbelt is buckled, stretches across an occupant of the seat. An anchor attaches one end of the webbing to a seat frame. The other end of the webbing feeds into a retractor, which includes a spool that pays out and retracts the webbing. A clip slides freely along the webbing and, when engaged with a buckle, divides the webbing into a lap band and a shoulder band. The seatbelt is typically a three-point harness, meaning that the webbing is attached at three points around the occupant when fastened: the anchor, the retractor, and the buckle.

In some vehicles, a subset of the seats (typically rear seats) include automatic locking mechanisms for use when installing a child seat for a small child or infant. When the webbing is fully paid out, the retractor switches to an automatic locking mode, in which the webbing may be retracted but not paid out. The webbing thus securely holds the child seat in the seat.

DETAILED DESCRIPTION

Figure 1:
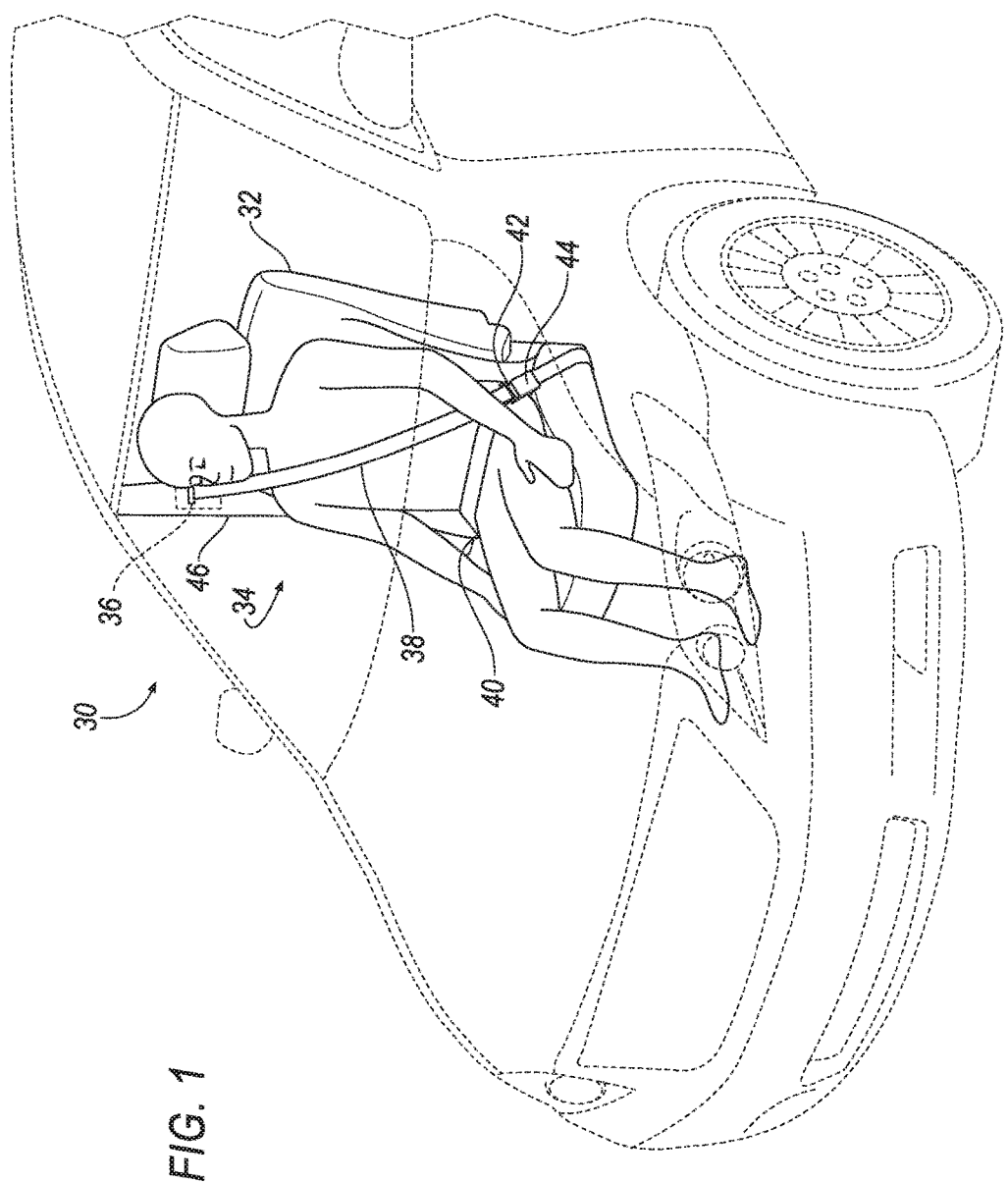
FIG. 1 is a perspective view of a vehicle seat with a restraint system in a vehicle.
Figure 2:
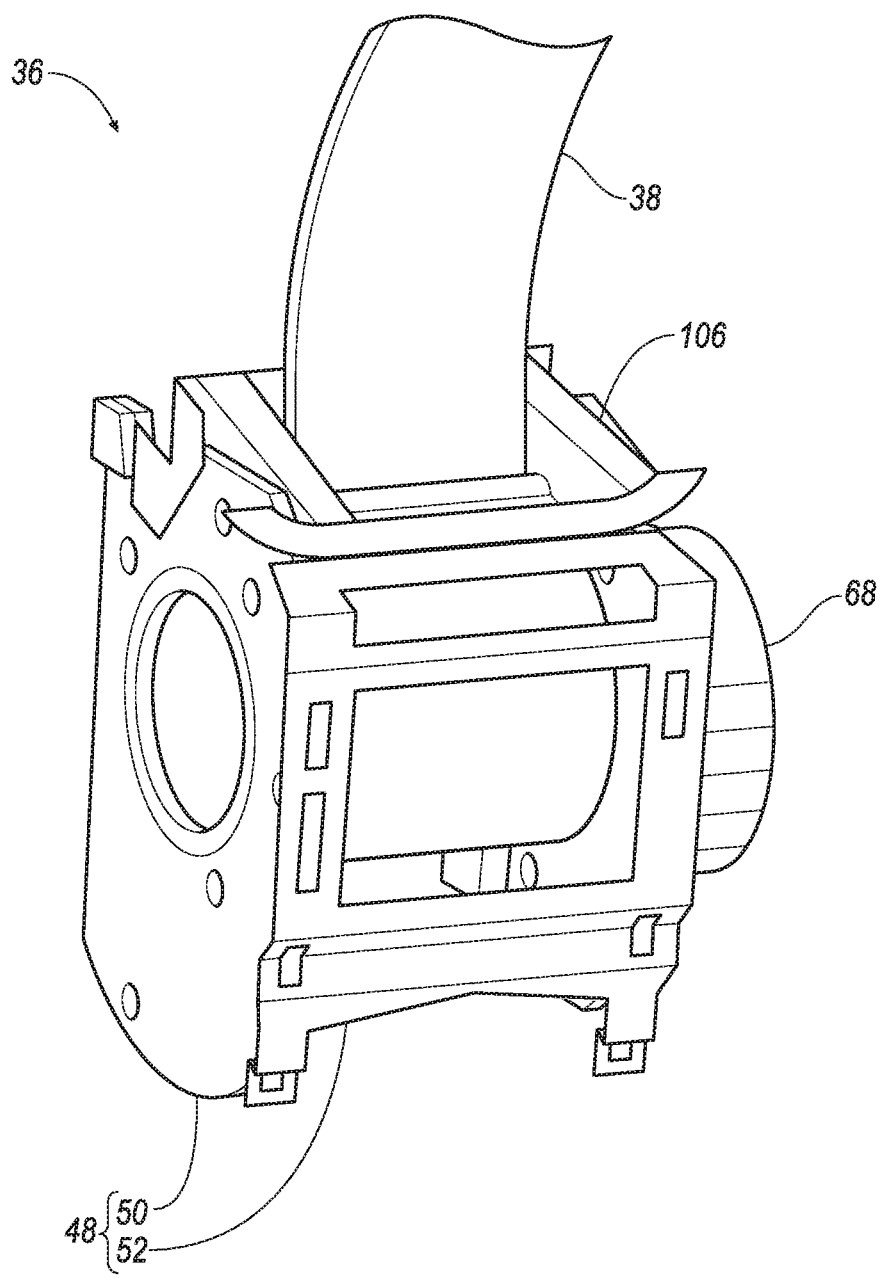
FIG. 2 is a perspective view of a portion of the restraint system.

With reference to the Figures, wherein like numerals indicate like parts throughout the several views, a restraint system 34 includes a housing 48, a spool 54 rotatably coupled to the housing 48, and an actuator 96 fixed relative to the housing 48. The spool 54 has a base plate 62 with holes 64. The holes 64 are spaced from each other circumferentially about the spool 54. The actuator 96 has a pin 98 movable between an engaged position extending into one of the holes 64 and a disengaged position spaced from the holes 64.

The pin 98 may be designed to break at a threshold force. The threshold force may be greater than a force exerted by the spool 54 in response to a CRABI 18-month-old child dummy in a rear-facing child seat during a frontal impact at 14 miles per hour. The threshold force may be less than a force exerted by the spool 54 in response to a Hybrid III 5th percentile female dummy during a frontal impact at 14 miles per hour. The threshold force may be greater than a force exerted by the spool 54 in response to a Hybrid III 6-year-old child dummy during a frontal impact at 14 miles per hour.

The restraint system 34 may include a control module 100 in communication with the actuator 96. The control module 100 may be programmed to move the pin 98 to the engaged position in response to a signal indicating an impact.

The spool 54 may have an axis of rotation R. The holes 64 may be located on a circle centered on the axis of rotation R. The base plate 62 may be orthogonal to the axis of rotation R. The actuator 96 may be spaced from the axis of rotation R by a distance equal to a radius of the circle. The holes 64 may be equally spaced along the circle. The pin 98 may be linearly movable along an axis parallel to the axis of rotation R.

The actuator 96 may be a solenoid.

The actuator 96 may be a linear actuator.

The restraint system 34 may include an automatic locking mechanism 66 coupled to the spool 54 and movable between an engaged state and a disengaged state. The restraint system 34 may also include webbing 38 attached to the spool 54, and the automatic locking mechanism 66 may move to the engaged state when the webbing 38 is fully paid out.

The restraint system 34 may include a torsion bar 82 fixed to the spool 54. The restraint system 34 may include an emergency locking mechanism 88. The torsion bar 82 may extend from a first end 84 fixed to the spool 54 to a second end 86, and the emergency locking mechanism 88 may be movable between a disengaged state spaced from the second end 86 and an engaged state engaging the second end 86.

The restraint system 34 may allow load-limiting payout of the webbing 38 during an impact if the occupant is an adult but prevent payout if the occupant is a child in a child seat. Load-limiting may prevent or reduce injuries to adult occupants during impacts by reducing the force exerted against the occupants. Preventing payout may keep a child seat from tilting forward or otherwise moving out of position during an impact, which may prevent or reduce injuries to child occupants.

With reference to FIG. 1, a vehicle 30 includes a seat 32 that may support an occupant. The seat 32 may be a front seat or a rear seat, and may be in any cross-vehicle position. The seat 32 shown in FIG. 1 is a bucket seat, but alternatively the seat 32 may be a bench seat or another type of seat. The occupant may be an adult or adolescent, as shown in FIG. 1, or the occupant may be a child car seat supporting an infant or young child.

The restraint system 34 may include a retractor assembly 36, the webbing 38 retractably payable from the retractor assembly 36, an anchor 40 coupled to the webbing 38, and a clip 42 that engages a buckle 44. The restraint system 34, when fastened, retains the occupant on the seat 32, e.g., during sudden decelerations of the vehicle 30.

The retractor assembly 36 may be attached to a body (not numbered) of the vehicle 30, e.g., to a B pillar 46 in the instance the seat 32 is a front seat, to a C pillar (not numbered) when the seat 32 is a rear seat, etc. The retractor assembly 36 may alternatively be mounted to the seat 32.

The anchor 40 attaches one end of the webbing 38 to the seat 32. The other end of the webbing 38 feeds into the retractor assembly 36. The clip 42 slides freely along the webbing 38 and, when engaged with the buckle 44, divides the webbing 38 into a lap band and a shoulder band.

The restraint system 34 of FIG. 1 is a three-point harness, meaning that the webbing 38 is attached at three points around the occupant when fastened: the anchor 40, the retractor assembly 36, and the buckle 44. The restraint system 34 may, alternatively, include another arrangement of attachment points.

The retractor assembly 36 may be contained in the housing 48. The housing 48 may include a housing body 50 and a housing cover 52 attached to the housing body 50. The housing 48 may be formed of metal or plastic. A webbing guide 106 may be attached to the housing 48. The housing 48 may be mounted to a body (not numbered) of the vehicle 30, e.g., to the B pillar 46 in the instance the seat 32 is a front seat, to a C pillar (not numbered) when the seat 32 is a rear seat, or may be mounted to the seat 32.

Figure 3:
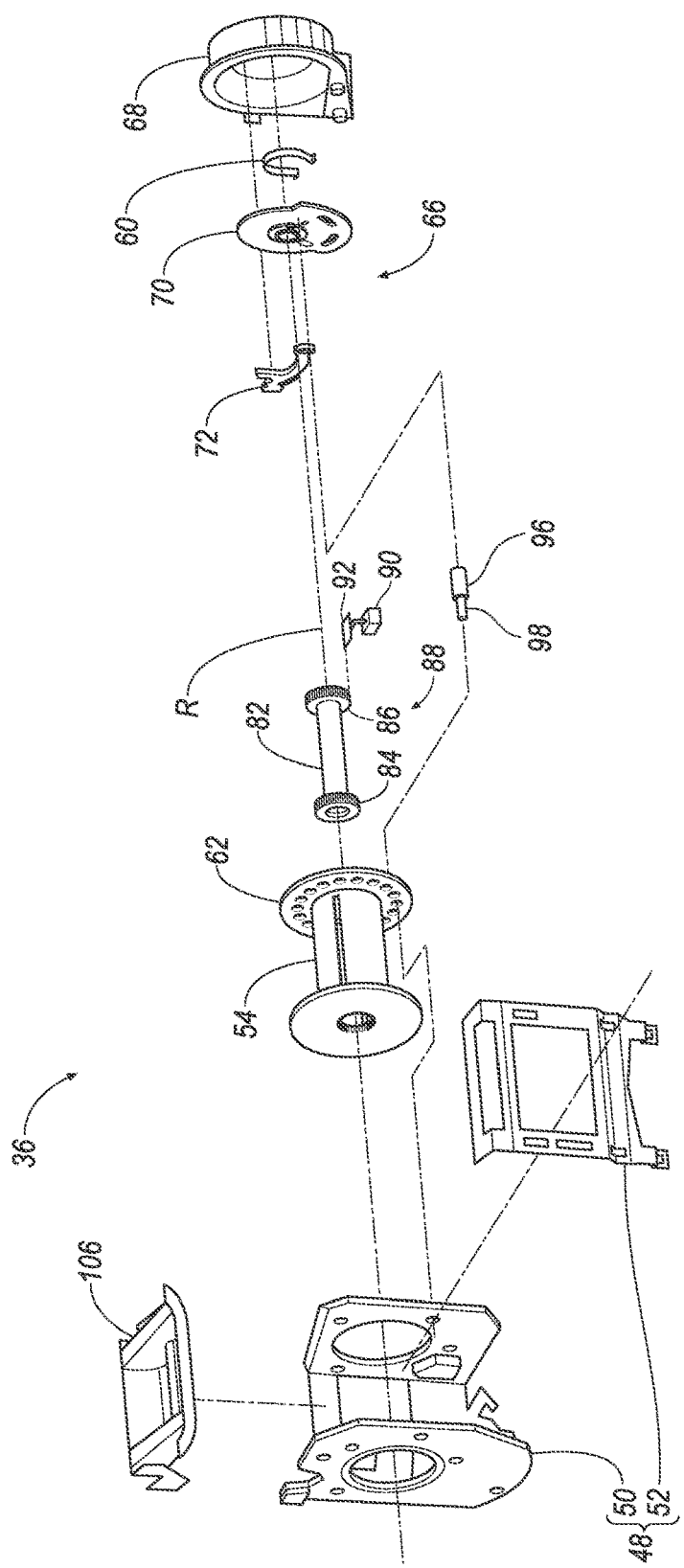
FIG. 3 is an exploded view of a retractor assembly of the restraint system.
Figure 4:
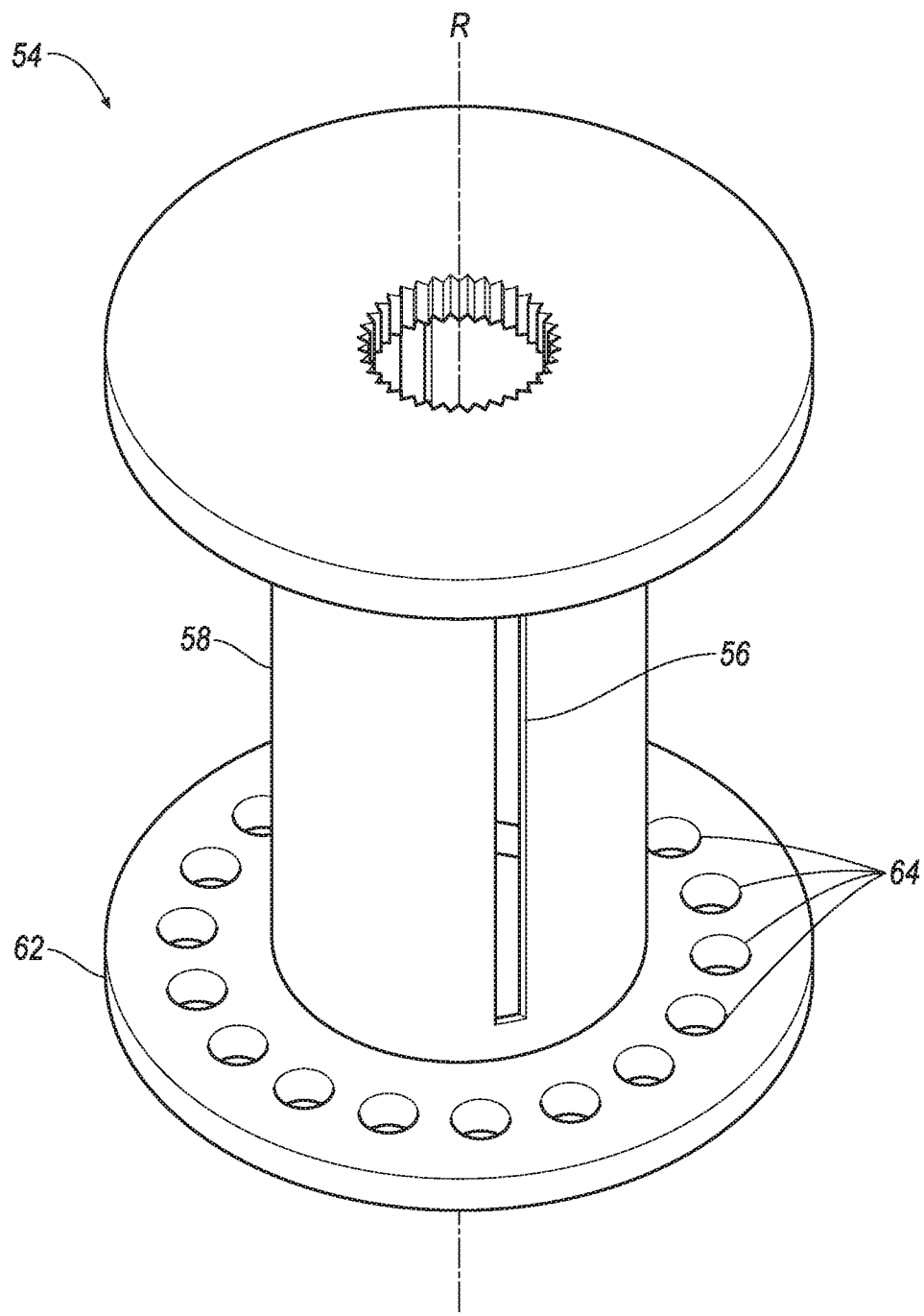
FIG. 4 is a perspective view of a spool of the retractor assembly.

With reference to FIGS. 3 and 4, the spool 54 is rotatably coupled to the housing 48. The spool 54 may freely rotate relative to the housing 48. The spool 54 may be cylindrical in shape. The spool 54 may define an axis of rotation R about which the spool 54 rotates. The spool 54 may be adapted to receive the webbing 38, for example, by including a webbing attachment slot 56 and permitting the webbing 38 to wind around the shaft 58 of the spool 54.

The webbing 38 may be attached to the spool 54. Specifically, one end of the webbing 38 may be attached to the anchor 40, and another end of the webbing 38 may be attached to the spool 54, with the webbing 38 wound around the spool 54 beginning at that end. The webbing 38 may be formed of fabric in the shape of a strap.

With reference to FIG. 3, a retractor spring 60 may extend from the housing 48 to the spool 54. The retractor spring 60 may be loaded in tension or compression when the webbing 38 is fully retracted, and the retractor spring 60 may be further loaded in either tension or compression when the webbing 38 is extended from the spool 54. Thus, the retractor spring 60 may exert a force tending to retract the webbing 38. The retractor spring 60 may be a spiral torsion spring or any other suitable type of spring.

With reference to FIG. 4, the base plate 62 may be fixed to the spool 54. Specifically, the base plate 62 may be fixed to one end of the spool 54 and rotate with the spool 54 about the axis of rotation R. The base plate 62 may be orthogonal to the axis of rotation R; in other words, the axis of rotation R may be at a right angle with a plane defined by the base plate 62. The base plate 62 may be integral with the shaft 58, i.e. formed simultaneously with the shaft 58 as a single continuous unit. Alternatively, the base plate 62 may be formed separately and subsequently attached to the shaft 58. The base plate 62 may have a circular shape. The base plate 62 may be formed of metal or plastic.

The base plate 62 includes the holes 64. The holes 64 are spaced from each other circumferentially about the spool 54. More specifically, the holes 64 may be located on a circle centered on the axis of rotation R. The holes 64 may be equally spaced along the circle; that is, the distance of each hole 64 from adjacent holes 64 is the same. The holes 64 may each be round or circular in shape. The holes 64 may each extend in a direction parallel to the axis of rotation R, that is, orthogonal to the base plate 62. The holes 64 may extend through the base plate 62.

Figure 5:
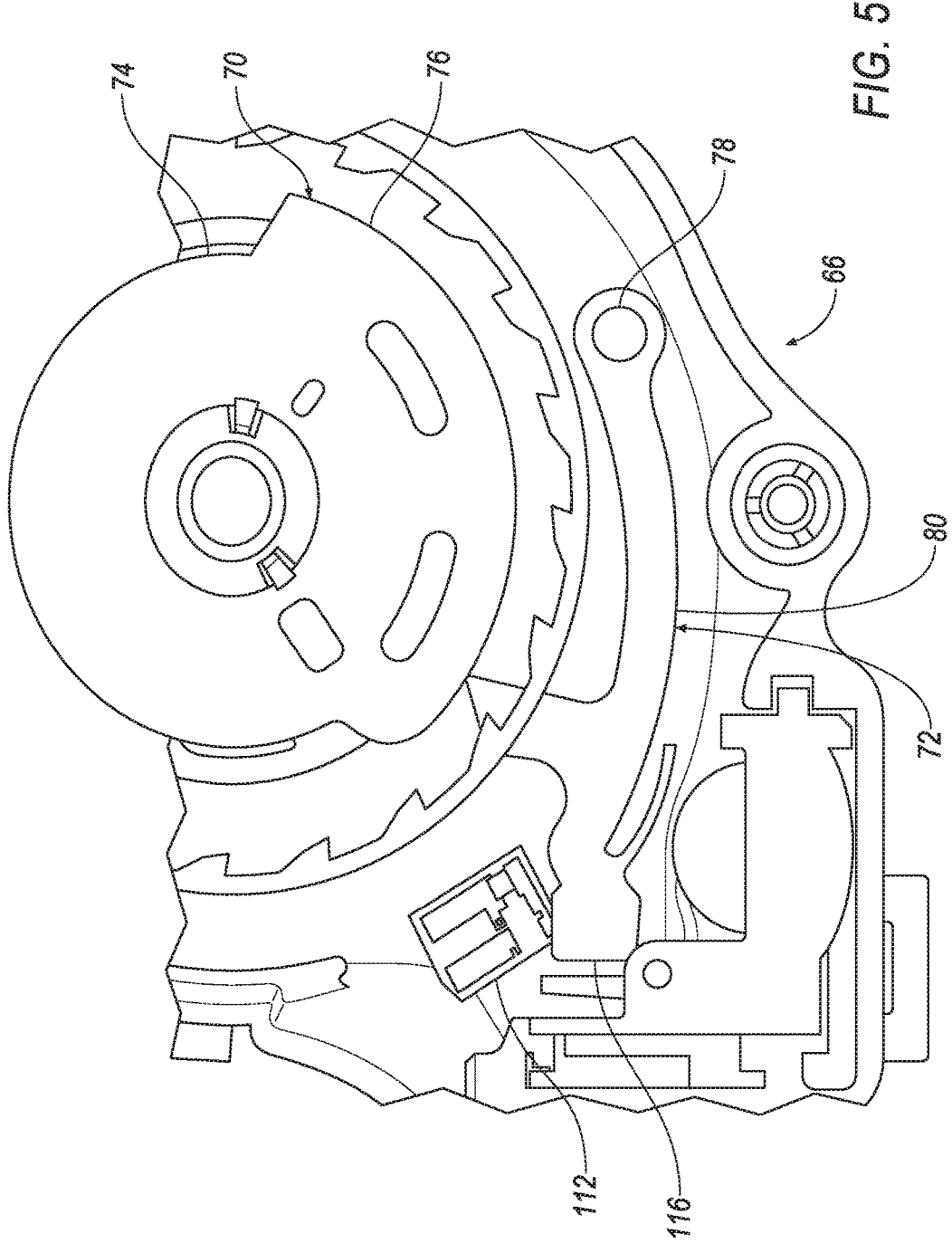
FIG. 5 is a plan view of an automatic locking mechanism of the retractor assembly.

With reference to FIG. 5, the automatic locking mechanism 66 may be coupled to the spool 54. An automatic locking mechanism cover 68 may be fixed to the housing 48 and may cover the automatic locking mechanism 66.

The automatic locking mechanism 66 may move between an engaged state (not shown) and a disengaged state, as shown in FIG. 5. The automatic locking mechanism 66 may move to the engaged state when the webbing 38 is fully extended from the spool 54. In the disengaged state, the automatic locking mechanism 66 allows the spool 54 to freely rotate so that the webbing 38 can extend from the spool 54. In the engaged state, the automatic locking mechanism 66 prevents the spool 54 from rotating in one direction, so the webbing 38 can retract but not extract. The automatic locking mechanism 66 may include a cam 70 and a lever 72 or any other suitable mechanism.

With continued reference to FIG. 5, the cam 70 may be fixed to the spool 54. The cam 70 may rotate about the axis of rotation R with the spool 54. The cam 70 may have a base surface 74 and a cam surface 76. The base surface 74 and the cam surface 76 may follow arcs of circles about the axis of rotation R. The cam surface 76 may have a greater radius of curvature than the base surface 74.

The lever 72 may be mounted to the housing 48 and engage the cam 70. The lever 72 may include any structure configured to pivot relative to the housing 48. The lever 72 may be fastened to the housing 48 via, for example, a fastener 78. The lever 72 may pivot relative to the housing 48 with the fastener 78 as a fulcrum. Moreover, the lever 72 may include an arm 80 configured to engage the cam 70. Alternatively, the lever 72 may engage the cam 70 without the arm 80. The lever 72 may have a position that depends on whether the lever 72 engages the base surface 74 or the cam surface 76 of the cam 70. The rotation of the cam 70 may cause the position of the lever 72 to change.

With reference to FIG. 3, the torsion bar 82 may be fixed or coupled to the automatic locking mechanism 66 and to the spool 54. The torsion bar 82 may extend from the first end 84 fixed to the spool 54 to the second end 86 engageable with the automatic locking mechanism 66. The torsion bar 82 may be designed to rotationally yield, e.g., plastically deform, as the torsion bar 82 is rotated by the spool 54 but fixed by the automatic locking mechanism 66. In particular, the torsion bar 82 may be formed of suitable shape, dimension, and material to yield when subjected to a threshold rotational force. For example, if the automatic locking mechanism 66 is in the engaged state but the webbing 38 exerts a rotational force on the spool 54, the torsion bar 82 may prevent the spool 54 from rotating unless the force exceeds a threshold, in which case the rotational yielding may permit the spool 54 to rotate. Thus, the load held by the webbing 38 may be limited.

Figure 6:
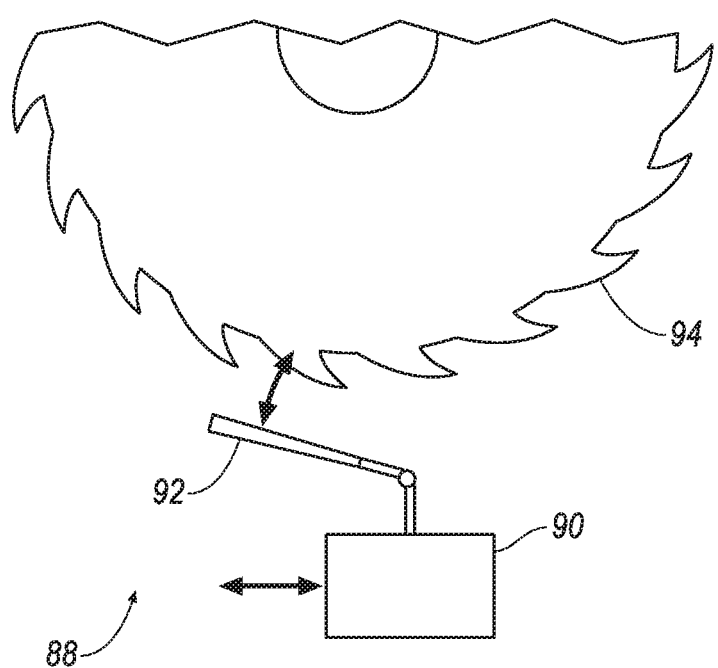
FIG. 6 is a plan view of an emergency locking mechanism of the retractor assembly.
Figure 7:
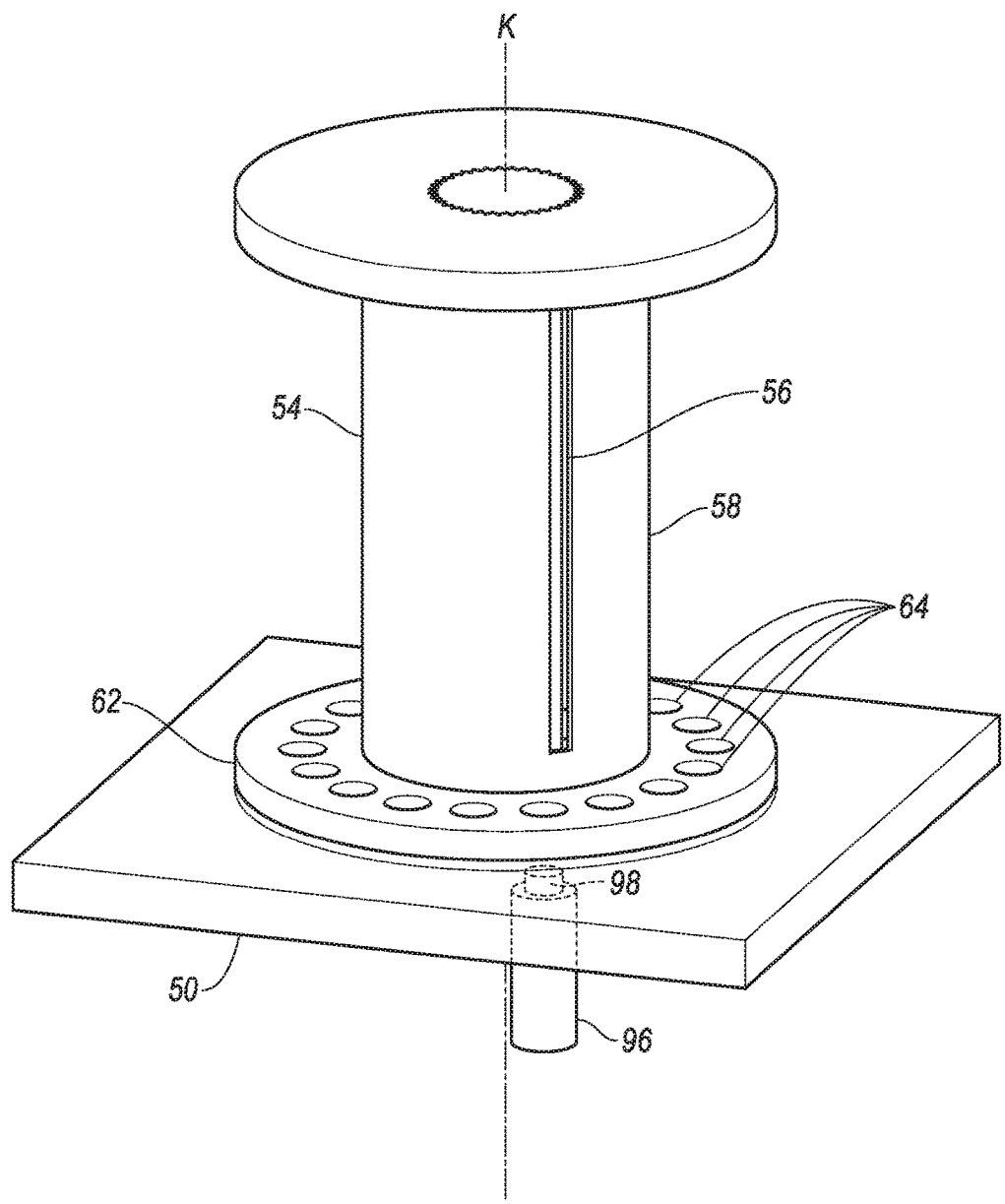
FIG. 7 is a perspective view of the spool, a portion of the housing, and an actuator in a disengaged position.
Figure 8:
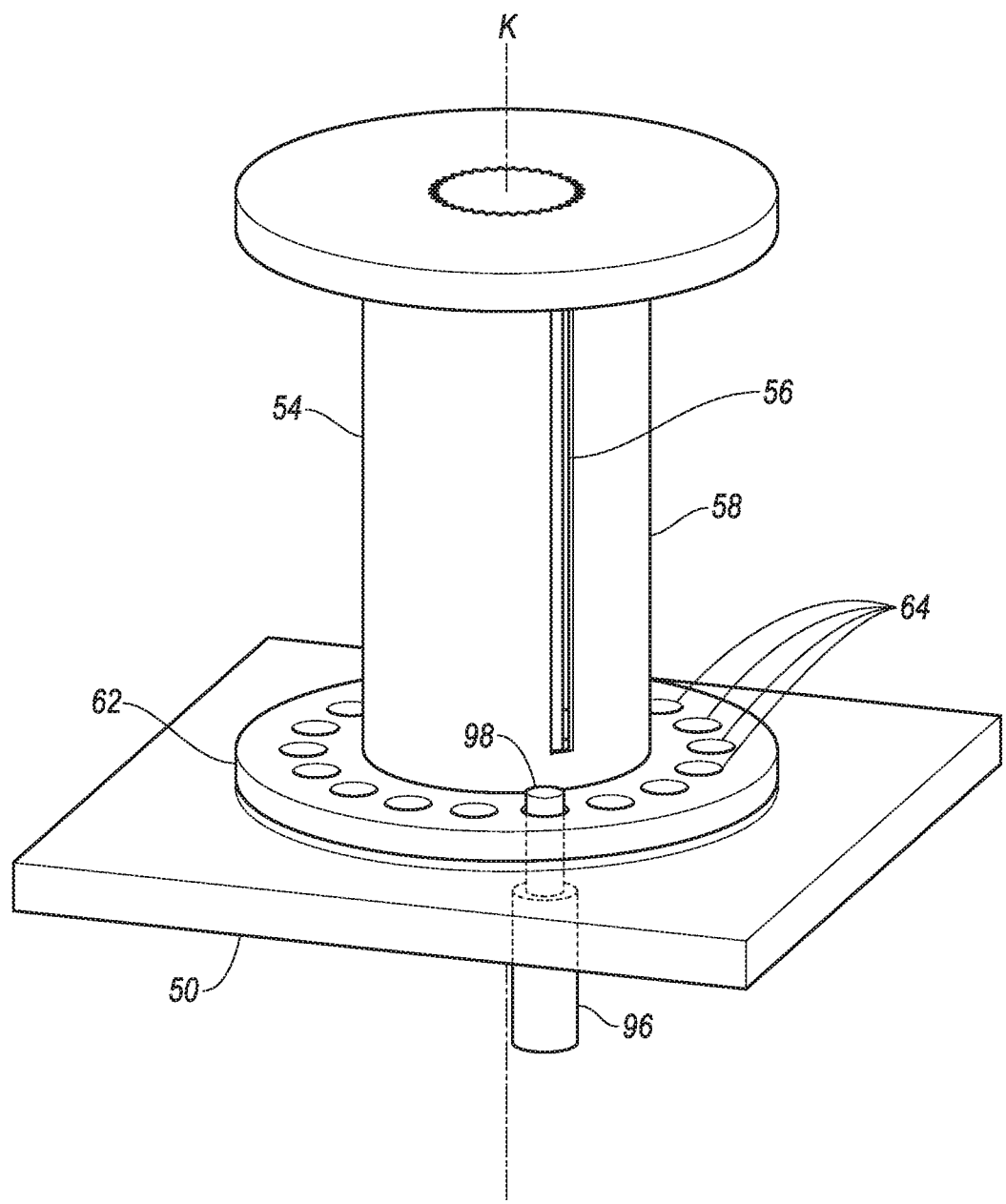
FIG. 8 is a perspective view of the spool, the portion of the housing, and the actuator in an engaged position.
Figure 9:
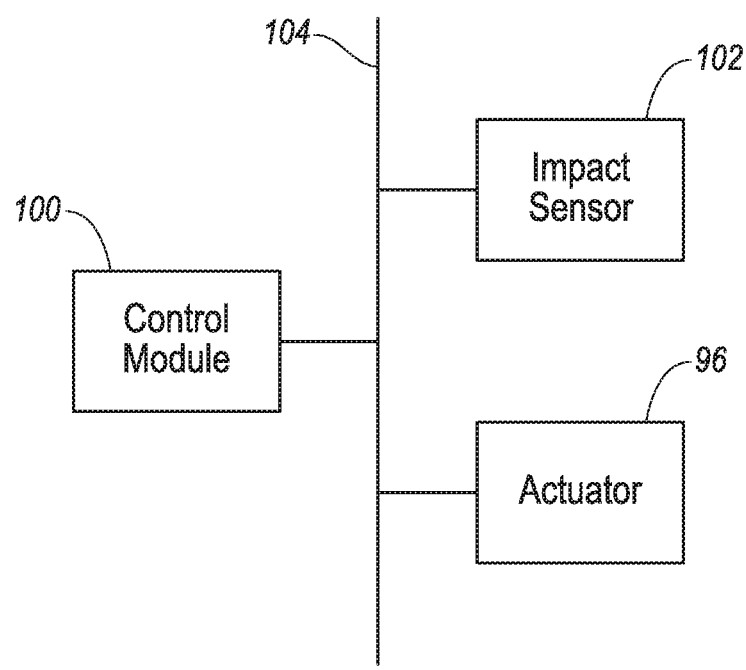
FIG. 9 is a block diagram of a control system for the restraint system.

With reference to FIG. 6, the emergency locking mechanism 88 may be coupled to the spool 54. The emergency locking mechanism 88 may be movable between a disengaged state spaced from the second end 86 of the torsion bar 82 and an engaged state engaging the second end 86. In the disengaged state, the emergency locking mechanism 88 allows the spool 54 to freely rotate so that the webbing 38 can extend from the spool 54. In the engaged state, the emergency locking mechanism 88 prevents the spool 54 from rotating in one direction, so the webbing 38 can retract but not extract. The emergency locking mechanism 88 may be triggered by sudden deceleration of the vehicle 30 (as shown in FIG. 6), sudden extraction of the webbing 38, or any other suitable trigger.

The emergency locking mechanism 88 may include a weighted pendulum 90 fixed relative to a pawl 92. The weighted pendulum 90 and the pawl 92 may be rotatable together relative to, e.g., the housing 48. The second end 86 of the torsion bar 82 may include a ratchet 94. When the vehicle 30 is moving at a constant speed, accelerating, or decelerating gradually, the weight of the weighted pendulum 90 causes the weighted pendulum 90 and the pawl 92 to be in a first position in which the pawl 92 is spaced from the ratchet 94. When the vehicle 30 suddenly decelerates, the momentum of the weighted pendulum 90 causes the weighted pendulum 90 and the pawl 92 to rotate to a second position, bringing the pawl 92 into contact with the ratchet 94. The pawl 92 then prevents the ratchet 94 from rotating about the axis of rotation R. When the pawl 92 is in contact with the ratchet 94, the emergency locking mechanism 88 is in the engaged state, and when the pawl 92 is spaced from the ratchet 94, the emergency locking mechanism 88 is in the disengaged state.

The actuator 96 may be fixed relative to the housing 48. For example, the actuator 96 may be coupled directly or indirectly to the housing 48. The actuator 96 may be spaced from the axis of rotation R by a distance equal to a radius of the circle on which the holes 64 of the base plate 62 are located; in other words, the actuator 96 may be radially aligned with the holes 64 about the axis of rotation R. The actuator 96 may be oriented parallel to the axis of rotation R.

The actuator 96 may be a linear actuator, that is, may be actuatable along a straight line. Specifically, the actuator 96 may be actuatable in a direction parallel to the axis of rotation R. The actuator 96 may be a solenoid. A solenoid uses a helical coil to produce an electromagnetic field to induce an object to move.

The actuator 96 may have the pin 98 movable between an engaged position extending into one of the holes 64 and a disengaged position spaced from the holes 64. The pin 98 may be linearly movable along an axis parallel to the axis of rotation R. More specifically, the pin 98 may be movable along the axis parallel to the axis of rotation R between the engaged position and the disengaged position. The pin 98 may have a circular cross-section smaller than the cross-section of one of the holes 64. In the engaged position, the pin 98 may occupy one of the holes 64.

The pin 98 may be designed to break at a threshold force. Specifically, the pin 98 may be designed to shear due to opposing lateral forces exerted by the base plate 62 and by the actuator 96 on the pin 98. When the pin 98 is in the engaged position in one of the holes 64 in the base plate 62, the base plate 62 may be experiencing a torque inducing the base plate 62 to rotate about the axis of rotation R, and the actuator 96 may be fixed circumferentially with respect to the axis of rotation R. The base plate 62 may thus push against the pin 98 while the actuator 96 resists motion by the pin 98.

The threshold force may be chosen such that most children in car seats will not cause the pin 98 to break during an impact but most adults will cause the pin 98 to break during an impact. In other words, children still using child seats, for example, rear-facing child seats, front-facing child seats, booster seats, etc. will not exert enough force to break the pin 98. Adolescents and adults, who are large enough to no longer use a child seat, will exert enough force to break the pin 98. The threshold force is between a lower boundary of force, exerted by children using child seats, and an upper boundary of force, exerted by adults not using child seats. For example, the threshold force may be greater than a force exerted by the spool 54 in response to a CRABI 18-month-old child dummy in a rear-facing child seat used for impact testing during a frontal impact at 14 miles per hour. The threshold force may be less than a force exerted by the spool 54 in response to a Hybrid III 5th percentile female dummy during a frontal impact at 14 miles per hour. The threshold force may be greater than a force exerted by the spool 54 in response to a Hybrid III 6-year-old child dummy during a frontal impact at 14 miles per hour.

The control module 100 is a microprocessor-based controller. The control module 100 may include a processor, memory, etc. The memory of the control module 100 may include memory for storing instructions executable by the processor as well as for electronically storing data and/or databases. The control module 100 may be a restraint control module (RCM), in other words, may be in communication with and may control airbags, pretensioners, etc. in the vehicle 30, among other functions.

An impact sensor 102 may be in communication with the control module 100. The impact sensor 102 is adapted to detect an impact to the vehicle 30. The impact sensor 102 may be of any suitable type, for example, post-contact sensors such as linear or angular accelerometers, gyroscopes, pressure sensors, and contact switches; and pre-impact sensors such as radar, lidar, and vision-sensing systems. The vision systems may include one or more cameras, CCD image sensors, CMOS image sensors, etc. The impact sensor 102 may be located at numerous points in or on the vehicle 30.

The control module 100 may transmit and receive signals through a communications network 104 such as a controller area network (CAN) bus, Ethernet, Local Interconnect Network (LIN), and/or by any other wired or wireless communications network. The control module 100 may be in communication with the impact sensor 102 and the actuator 96 via the communications network 104.

The control module 100 may be programmed to move the pin 98 to the engaged position in response to a signal indicating an impact. The control module 100 may be further programmed to only move the pin 98 to the engaged position if the seat 32 is occupied, e.g., if the clip 42 is buckled into the buckle 44, if a weight sensor in the seat 32 indicates weight above a threshold, etc.

In the event of a frontal impact, the impact sensor 102 may detect the impact and transmit a signal through the communications network 104 to the control module 100. The control module 100 may transmit a signal through the communications network 104 to the actuator 96 to actuate, that is, to move the pin 98 from the disengaged position to the engaged position. Substantially simultaneously, an occupant of the seat 32 has forward momentum relative to the seat 32 and exerts a tensile force on the webbing 38. The occupant may be a child in a child seat or may be an older child or adult not in a child seat. The emergency locking mechanism 88 may engage, preventing the forward momentum of the occupant from freely paying out the webbing 38. Alternatively or additionally, if the occupant is a child in a child seat, the automatic locking mechanism 66 may be engaged and prevent the forward momentum of the occupant from freely paying out the webbing 38. The torsion bar 82 resists the torque on the spool 54. Upon receiving the signal from the control module 100, the actuator 96 moves the pin 98 from the disengaged position toward the base plate 62. The pin 98 may move into one of the holes 64 or may push against the base plate 62 between two of the holes 64. The spool 54 may then rotate, allowing the pin 98 to move into one of the holes 64. The pin 98 resists the motion of the spool 54. If the occupant is a child in a child seat, the pin 98 may be strong enough to resist breaking and may thus prevent payout of the webbing 38. If the occupant is a larger child or adult, the pin 98 may break. If the force that the occupant exerts on the webbing 38 exceeds a threshold for the torsion bar 82, then the torsion bar 82 yields, allowing the spool 54 to rotate and the webbing 38 to pay out a distance. Thus, in the event of an impact, the restraint system 34 may allow payout for adults and larger children but not for children in child seats.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A restraint system comprising:
   a housing;
   a spool rotatably coupled to the housing, the spool having a base plate with holes, the holes being spaced from each other circumferentially about the spool;
   an actuator fixed relative to the housing and having a pin movable between an engaged position extending into one of the holes and a disengaged position spaced from the holes; and
   a control module in communication with the actuator, wherein the control module is programmed to move the pin to the engaged position in response to a signal indicating an impact.

2. The restraint system of claim 1, wherein the pin is designed to break at a threshold force, the threshold force being greater than a force exerted by the spool in response to a CRABI 18-month-old child dummy in a rear-facing child seat during a frontal impact at 14 miles per hour.

3. The restraint system of claim 2, wherein the threshold force is less than a force exerted by the spool in response to a Hybrid III 5th percentile female dummy during a frontal impact at 14 miles per hour.

4. The restraint system of claim 3, wherein the threshold force is greater than a force exerted by the spool in response to a Hybrid III 6-year-old child dummy during a frontal impact at 14 miles per hour.

5. The restraint system of claim 1, wherein the spool has an axis of rotation, and the holes are located on a circle centered on the axis of rotation.

6. The restraint system of claim 5, wherein the base plate is orthogonal to the axis of rotation.

7. The restraint system of claim 6, wherein the actuator is spaced from the axis of rotation by a distance equal to a radius of the circle.

8. The restraint system of claim 7, wherein the holes are equally spaced along the circle.

9. The restraint system of claim 8, wherein the pin is linearly movable along an axis parallel to the axis of rotation.

10. The restraint system of claim 1, wherein the actuator is a solenoid.

11. The restraint system of claim 1, wherein the actuator is a linear actuator.

12. The restraint system of claim 1, further comprising an automatic locking mechanism coupled to the spool and movable between an engaged state and a disengaged state.

13. The restraint system of claim 12, further comprising webbing attached to the spool, the automatic locking mechanism moving to the engaged state when the webbing is fully paid out.

14. The restraint system of claim 1, further comprising a torsion bar fixed to the spool.

15. The restraint system of claim 14, further comprising an emergency locking mechanism, wherein the torsion bar extends from a first end fixed to the spool to a second end, and the emergency locking mechanism is movable between a disengaged state spaced from the second end and an engaged state engaging the second end.

* * * * *